US012081921B2

(12) United States Patent
Rietveld (10) Patent No.: US 12,081,921 B2
(45) Date of Patent: Sep. 3, 2024

(54) PORT OCCUPANCY DETECTION

(71) Applicant: CommScope Technologies LLC, Hickory, NC (US)

(72) Inventor: Jan Willem Rietveld, Benschop (NL)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 18/300,267

(22) Filed: Apr. 13, 2023

(65) Prior Publication Data

US 2023/0328410 A1  Oct. 12, 2023

Related U.S. Application Data (63) Continuation of application No. PCT/US2021/054838, filed on Oct. 13, 2021.

(60) Provisional application No. 63/092,709, filed on Oct. 16, 2020.

(51) Int. Cl.
*H04Q 1/02* (2006.01)

(52) U.S. Cl.
CPC .................. *H04Q 1/138* (2013.01)

(58) Field of Classification Search
CPC ..................................... H04Q 1/138
USPC ........................................... 340/687
See application file for complete search history.

(56) References Cited

U.S. PATENT DOCUMENTS

| | | | | |
|---|---|---|---|---|
| 7,867,017 B1* | 1/2011 | Chen | ................... | H01R 13/7031 439/488 |
| 8,596,882 B2 | 12/2013 | Smrha et al. | | |
| 8,992,260 B2 | 3/2015 | Coffey et al. | | |
| 9,054,440 B2 | 6/2015 | Taylor et al. | | |
| 2006/0148279 A1* | 7/2006 | German | ................... | H04Q 1/138 439/49 |
| 2007/0149013 A1* | 6/2007 | Eastham | ............. | H02J 13/0005 439/140 |
| 2013/0260603 A1* | 10/2013 | Caveney | ................ | H04Q 1/149 439/490 |
| 2019/0069049 A1* | 2/2019 | Crawford | ............... | H04Q 1/149 |

FOREIGN PATENT DOCUMENTS

| | | |
|---|---|---|
| CN | 201877657 U | 6/2011 |
| WO | 2020/106711 A1 | 5/2020 |

OTHER PUBLICATIONS

International Search Report and Written Opinion for Application No. PCT/US2021/054838 mailed Feb. 10, 2022.

* cited by examiner

*Primary Examiner* — Kerri L McNally
(74) *Attorney, Agent, or Firm* — Merchant & Gould P.C.

(57) ABSTRACT

Port occupancy can be detected by positioning signal responders on shutters disposed at the ports. The signal responders are detectable when the shutters are undeflected (i.e., the respective ports are available). The signal responders are not detectable when the shutters are deflected (i.e., the respective ports are occupied). The signal responders may include RFID tags. Each shutter having a corresponding signal responder may span more than one port.

20 Claims, 9 Drawing Sheets

PORT OCCUPANCY DETECTION

CROSS-REFERENCE TO RELATED APPLICATIONS

This application is a Continuation of International Patent Application No. PCT/US2021/054838, filed on Oct. 13, 2021, which claims the benefit of U.S. Patent Application Ser. No. 63/092,709, filed on Oct. 16, 2020, the disclosures of which are incorporated herein by reference in their entireties. To the extent appropriate, a claim of priority is made to each of the above disclosed applications.

BACKGROUND

Automated systems have been developed for monitoring and recording cable connections at termination ports. However, many of these known systems require active electronics to be incorporated into the systems at the termination ports. For example, U.S. Pat. No. 8,994,547 discloses a circuit board carrying signal emitters (e.g., an infra-red emitter) and corresponding signal detectors (e.g., an infra-red detector) mounted at a patch panel. In such systems, the emitters and detectors are disposed at opposite sides of the termination ports, thereby limiting the density of the termination ports. Further, in such systems, the emitters and detectors are each hardwires to processors via the circuit board; each of these components takes up space within the system.

Others of these known systems require the use of specialized cables (e.g., cables having a sensing wire) or cables terminated by specialized plug connectors (e.g., plug connectors that carry identification components, sensing pads, etc.) that interact with detectors at the ports. For example, U.S. Pat. No. 9,140,859 discloses mounting EEPROMs storing physical layer information (PLI) onto plug connectors along with a contact interface. As another example, U.S. Pat. No. 7,468,669 discloses interconnect cables terminated by plug connectors carrying RFID transponders that can be read by a handheld RFID scanner.

RFID is a generic term for technologies that use radio waves or radio frequency (RF) signals to automatically identify objects. Passive and active RFID transponders or tags contain coiled antennas to enable them to receive and respond to radio-frequency queries from an RFID reader or transceiver (which also includes an antenna). Once queried, the RFID transponder generates a radio wave signal containing information concerning the tagged object. The transceiver converts the radio waves returned from the RFID transponder into a form that can be stored and manipulated on a computer, such as digital bytes of data. Passive RFID transponders do not have a power supply. A minute electrical current induced in an antenna of the transponder by the incoming radio-frequency query scan provides enough power for the transponder to transmit a response in the form of the stored data. Active RFID transponders have an on-board power source and may have longer ranges and larger memories than passive tags. Semi-passive RFID transponders may use an on-board power source to run the transponder's circuitry, but communicate with the reader by drawing power from the radio wave generated by the reader, like a passive transponder. Memory chips in RFID transponders may be configured as read-write or read-only, depending upon the particular application. Particular advantages to RFID identification systems are that such systems are reliable, cost effective, and the components can be very small in size.

Improvements are desired. For example, automated systems that can detect insertion and/or removal of non-specialized plug connectors and non-specialized cables are desired. Further, automated systems with enhanced port density are desired.

SUMMARY

Some aspects of the disclosure are directed to systems, components, and methods for sensing the presence of a plug connector at a port. In certain implementations, the port is defined by an optical adapter. A shutter is mounted at the port to move between an undeflected position and a deflected position. The shutter blocks access to the port when in the undeflected position. The shutter allows access to the port when in the deflected position. The shutter carries a component to be sensed when the shutter moves between the undeflected and deflected positions. The component and a reader are configured to determine whether the shutter is disposed in the undeflected position or the deflected position. In certain examples, the reader cannot sense the component when the shutter is disposed in the deflected position.

In various implementations, the port is one of many ports defined by an optical component, such as a termination module, a termination cassette, a termination block, a termination panel, a termination blade, etc.

In certain implementations, the component includes an RFID tag and the reader includes an RFID reader configured to transmit power to the RFID tag and to receive a radio frequency (RF) signal back from the RFID tag in response.

In certain examples, the RFID tag changes between first and second orientations relative to the reader when the shutter moves between the undeflected and deflected positions. In certain examples, the reader is able to sense the RFID tag when the RFID tag is disposed in the first orientation and is not able to sense the RFID tag when the RFID tag is disposed in the second orientation.

In certain examples, at least a portion of the RFID tag contacts an inhibitor that impedes the ability of the RFID tag to send signals back to the reader. The RFID tag contacts the inhibitor when the shutter is disposed in the deflected position and does not contact the inhibitor when the shutter is disposed in the undeflected position.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a termination component 100 including a body 110 carrying a plug receptacle 112 defining a termination port 114. A shutter 116 is mounted to the body 110 at the plug receptacle 112. The shutter 116 is movable between an undeflected position and a deflected position. When the termination port 114 is unoccupied (i.e., when no plug connector is received at the plug receptacle 112), the shutter 116 is disposed in the undeflected position (e.g., see shutter 116a in FIG. 1). When a plug connector 118 is received at the plug receptacle 112, the shutter 116 is disposed in the deflected position (e.g., see shutter 116b in FIG. 1).

Figure 3:
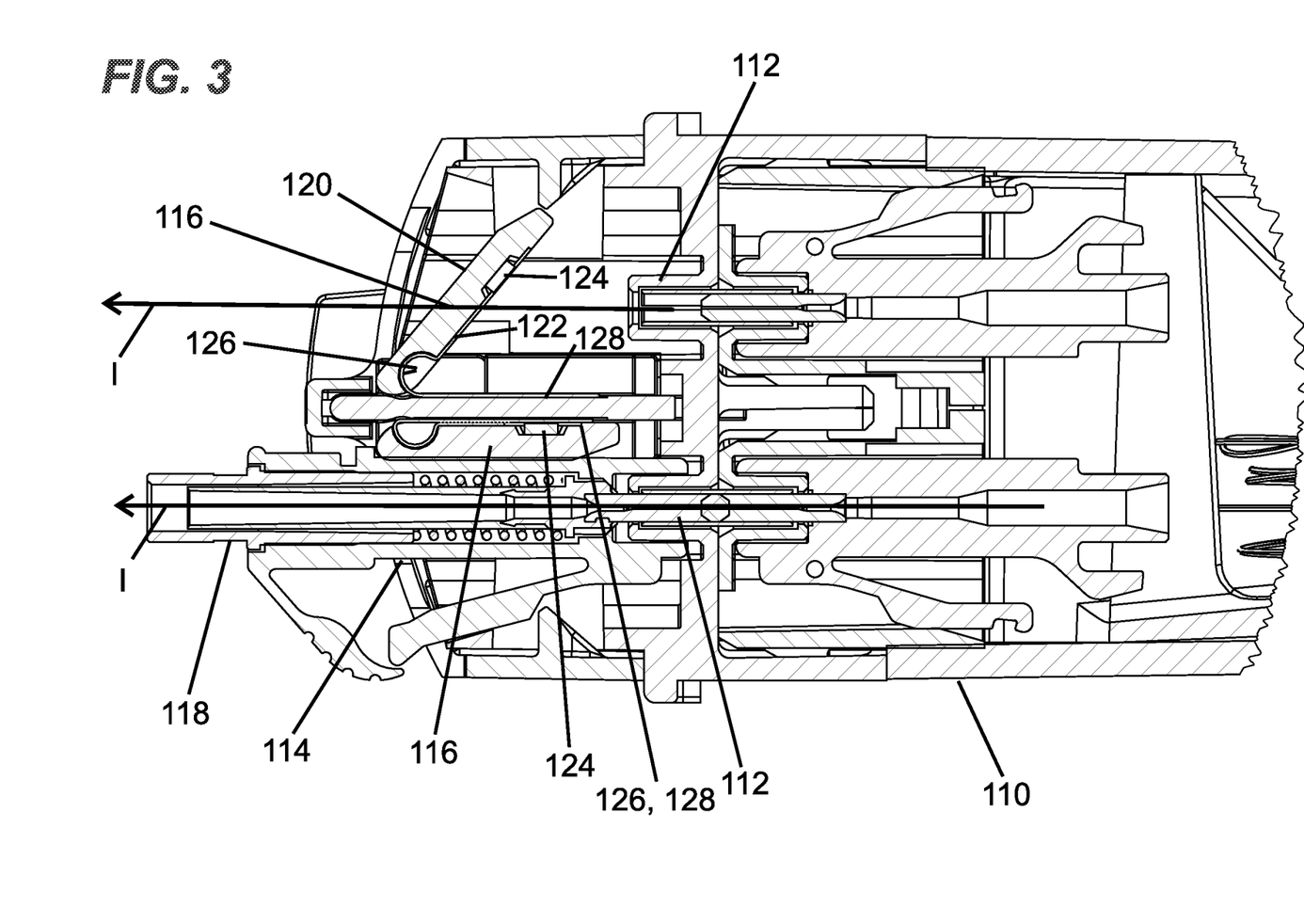
FIG. 3 is an axial cross-sectional profile taken along a plane extending coaxial with the insertion axes of the two ports cut through in FIG. 1.
Figure 4:
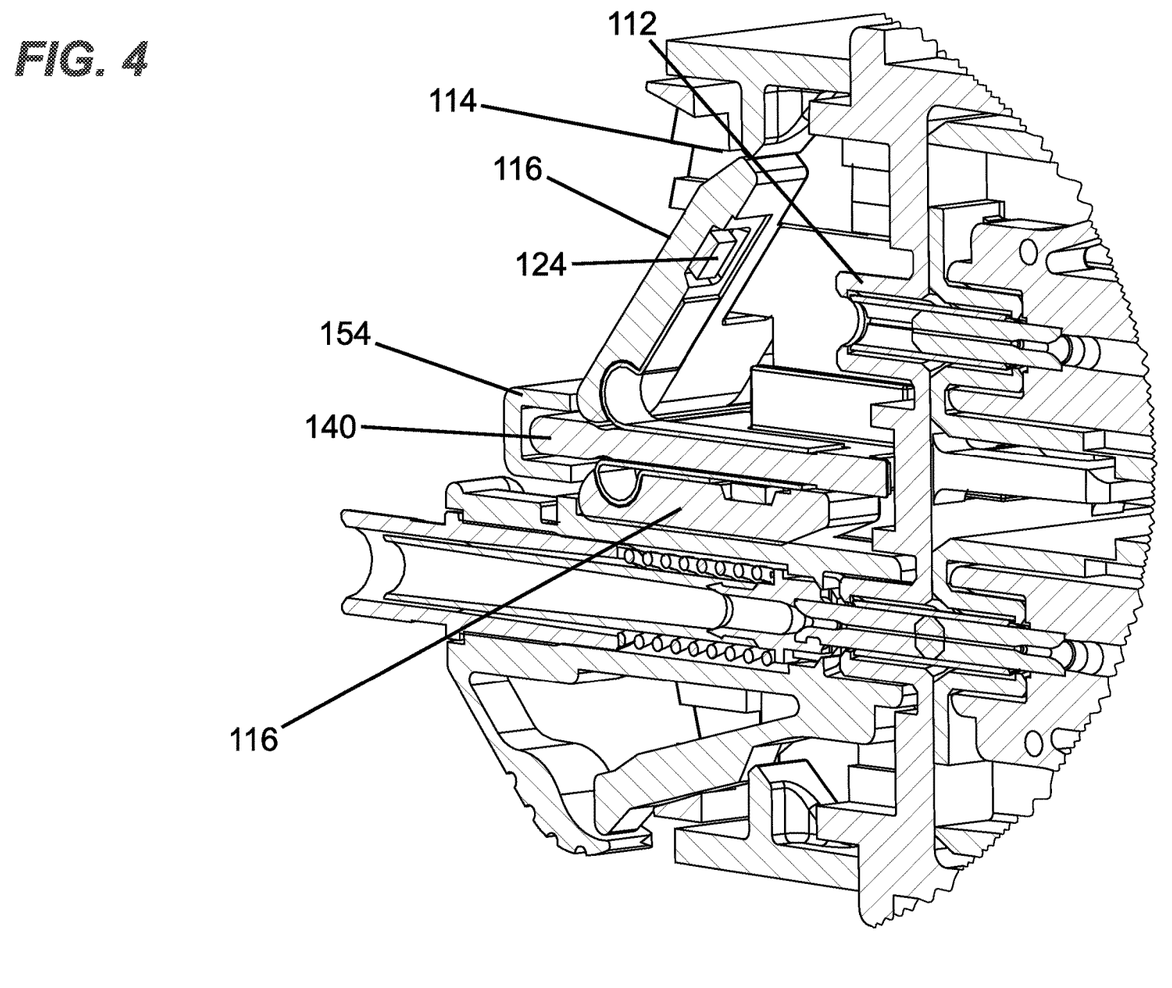
FIG. 4 is a rear perspective view of the portion of the termination component shown in FIG. 2.

The shutter 116 has an exterior side 120 that faces outwardly from the port 114 and an interior side 122 that faces into the port 114 when the shutter 116 is disposed in the undeflected position. An insertion axis I for each plug receptacle 112 intersects the interior side 122 of the shutter 116 when the shutter 116 is disposed in the undeflected position. When moved to the deflected position, the insertion axis I no longer intersects the shutter 116. In some implementations, the shutter 116 extends generally vertically across the insertion axis I. In other implementations, however, the shutter 116 extends at an angle across the insertion axis I (e.g., see FIG. 3).

A signal responder 124 is mounted to the shutter 116. The signal responder 124 is configured to emit a response signal when a triggering signal (e.g., a query signal from an RFID scanner) is received. The shutter 116 carries the signal responder 124 along as the shutter 116 moves between the undeflected and deflected positions. The signal responder 124 is detectable (e.g., emits a response signal readable by the RFID scanner) when the shutter 116 is disposed in the undeflected position. The signal responder 124 is not detectable (e.g., is unable to receive the triggering signal and/or is unable to emit the response signal) when the shutter 116 is disposed in the deflected position.

In certain implementations, the signal responder 124 includes both a memory that stores a response signal (e.g., a serial identification number) and a transceiver that enables the stored response signal to be wirelessly transmitted to a scanner (e.g., a handheld scanner). For example, the signal responder 124 can include an RFID tag. In some examples, the signal responder 124 includes an active RFID tag. In other examples, the signal responder 124 includes a passive RFID tag. In some examples, the signal responder 124 includes a read-only memory. In other examples, the signal responder 124 includes a read-write memory. In still other examples, the signal responder 124 includes a WORM (write once, read many) memory.

Figure 5:
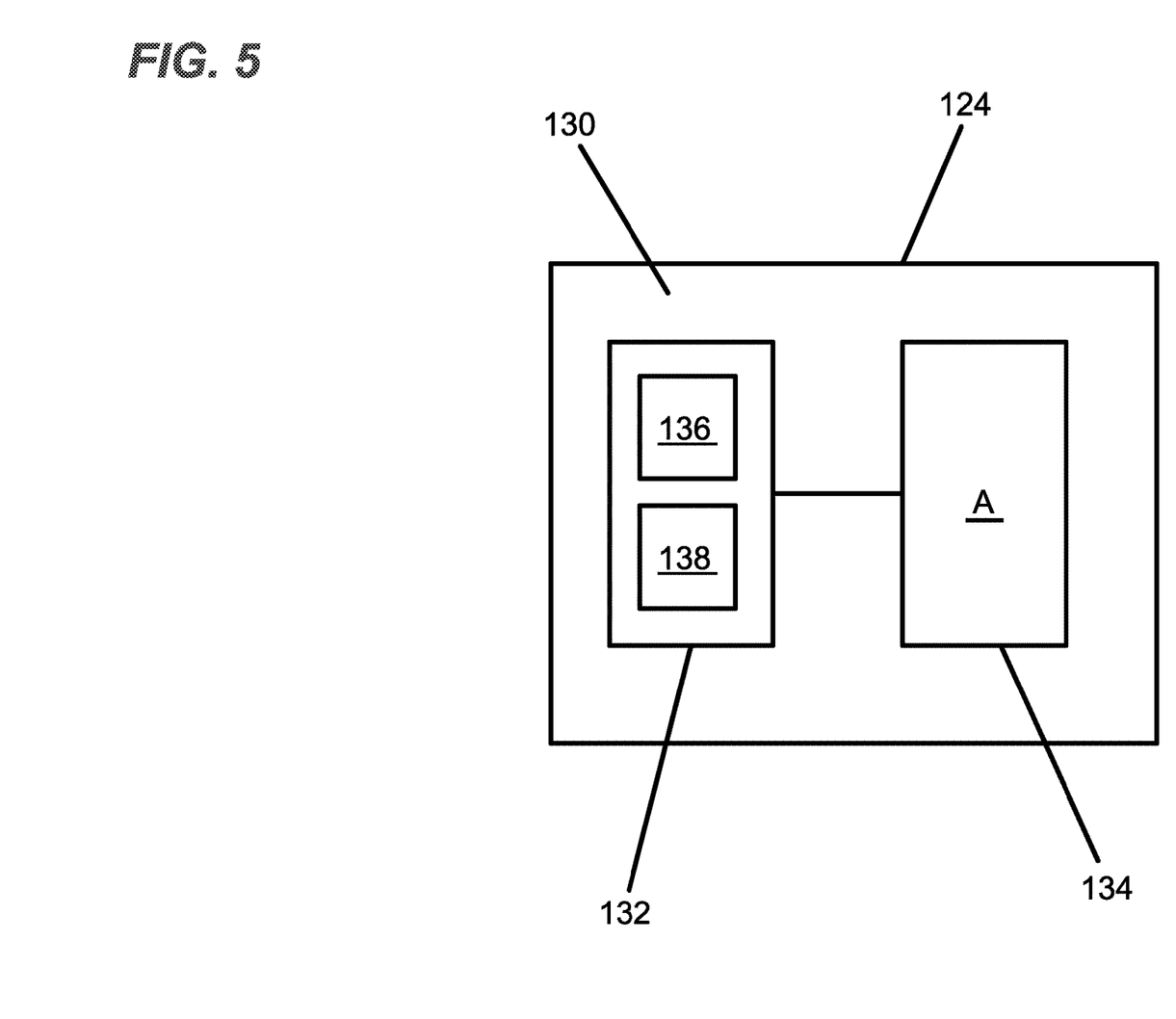
FIG. 5 is a schematic diagram of an example signal responder implemented as an RFID tag.
Figure 6:
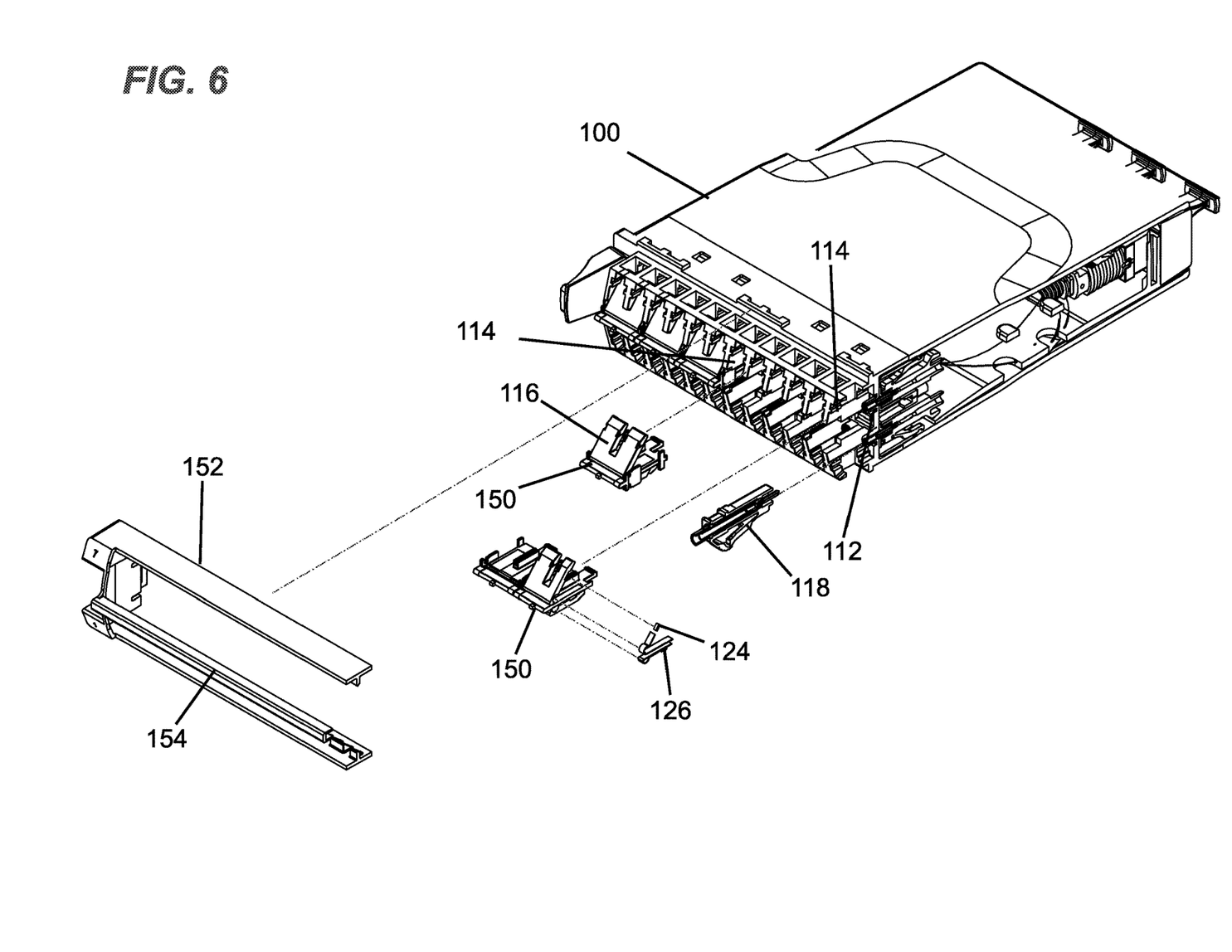
FIG. 6 is an exploded view of the termination component of FIG. 1.

FIG. 5 illustrates an example signal responder 124 suitable for use with the termination component 100. In FIG. 5, the signal responder 124 is implemented as an RFID transponder. The signal responder 124 includes a substrate 130 carrying an integrated circuit 132 and an antenna 134. The integrated circuit 132 includes a memory 136 in which the response signal is stored and a processor 138 that reads the memory 136 when sufficient power is received by the antenna 134. The processor 138 also causes the antenna 134 to transmit the stored information (e.g., as radio-frequency signals).

In some implementations, movement of the signal responder 124 to the deflected position renders the signal responder 124 unreadable by moving the signal responder 124 out of alignment with the scanner. For example, an antenna of the signal responder 124 may no longer be disposed within the electro-magnetic field generated by the scanner. In other implementations, movement of the signal responder 124 to the deflected position may cause physical contact between the signal responder 124 and an inhibitor 128. For example, the inhibitor 128 may be formed of a material (e.g., metal) that interferes with the functioning of the signal responder 124 (e.g., interferes with the 134 antenna of the signal responder 124).

In certain implementations, the shutter 116 is biased to the undeflected position by a spring 126. In certain examples, the spring 126 includes a metal leaf spring. In certain implementations, the spring 126 has a first part 126a that extends over the interior side 122 of the shutter 116 and a second part 126b that extends into the port 114 of the plug receptacle 112. In certain examples, the second part 126b of the spring 126 forms the inhibitor 128. In some implementations, the signal responder 124 (e.g., an antenna of the signal responder 124) physically contacts the second part 126b of the spring 126 when the shutter 116 is disposed in the deflected position. In other implementations, the signal responder 124 is positioned sufficiently close to the inhibitor 128 to interfere with the emission and/or reception of radio frequency signals at the signal responder 124.

In use, a scanner (e.g., a handheld scanner) sends out a triggering signal (e.g., a radio frequency signal) towards the signal responders 124 at the termination component 100. As each signal responder 124 receives the triggering signal, the signal responder 124 transmits the response signal stored in memory 136 using the antenna 134. The scanner receives the response signals from the signal responders 124 and provides the signals to a system processor (e.g., within the scanner, cabled to the scanner, wirelessly connected to the scanner, etc.). By analyzing the response signals received, the system processor can determine which shutters 116 are deflected and which shutters 116 are undeflected. From this information, the system processor can make a logical inference of which termination ports are occupied and which ports are available.

In certain implementations, it is possible to automatically track the connections (e.g., patching connections) within a communications system by detecting the insertions and removals of cables (e.g., of plug connectors terminating the cables) at the termination ports if operators of the system follow certain conventions when making connections. For example, when an operator inserts a plug connector terminating a first end of a cable into a port 114 on a first termination component 100, the plug connector pushes the shutter 116 from the undeflected position to the deflected position. If the scanner is periodically sending out triggering signals (e.g., every few seconds, every few milliseconds, every few microseconds, every few minutes, etc.), then the system processor will detect this insertion when the scanner stops receiving a response signal from the signal responder associated with the shutter 116 deflected by the plug. At some point in time thereafter, the operator inserts a second plug terminating the opposite end of the cable into a port 114 on another termination component 100 (e.g., the same termination component or another termination component). The system processor will detect this insertion when the scanner stops receiving a response signal from the signal responder associated with the shutter 116 deflected by the second plug. By instructing operators of the communications system to always plug in the two ends of a cable into their respective connector ports before proceeding to plug in (or remove) any other cables in the communications system, the communications system may make a logical inference that a cable is connected between the identified ports on the first and second termination components 100. Thus, in this fashion, the communications system may automatically track connections between the termination components 100 without specialized cables or specialized plug connectors. Similar operations may be performed to track the removal of cables.

Figure 8:
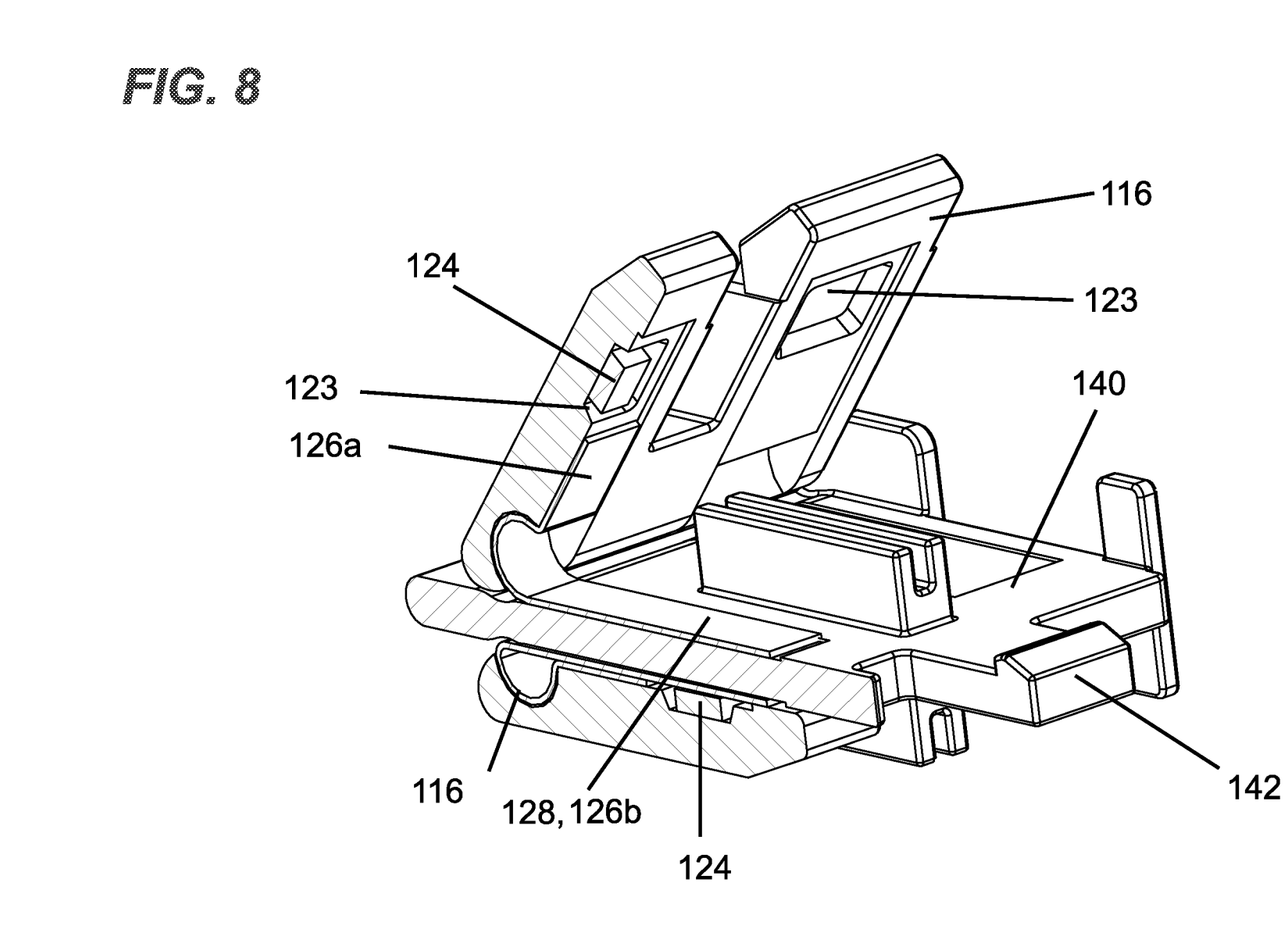
FIG. 8 is a rear perspective view of the shutter sub-assembly of FIG. 7 shown assembled.
Figure 9:
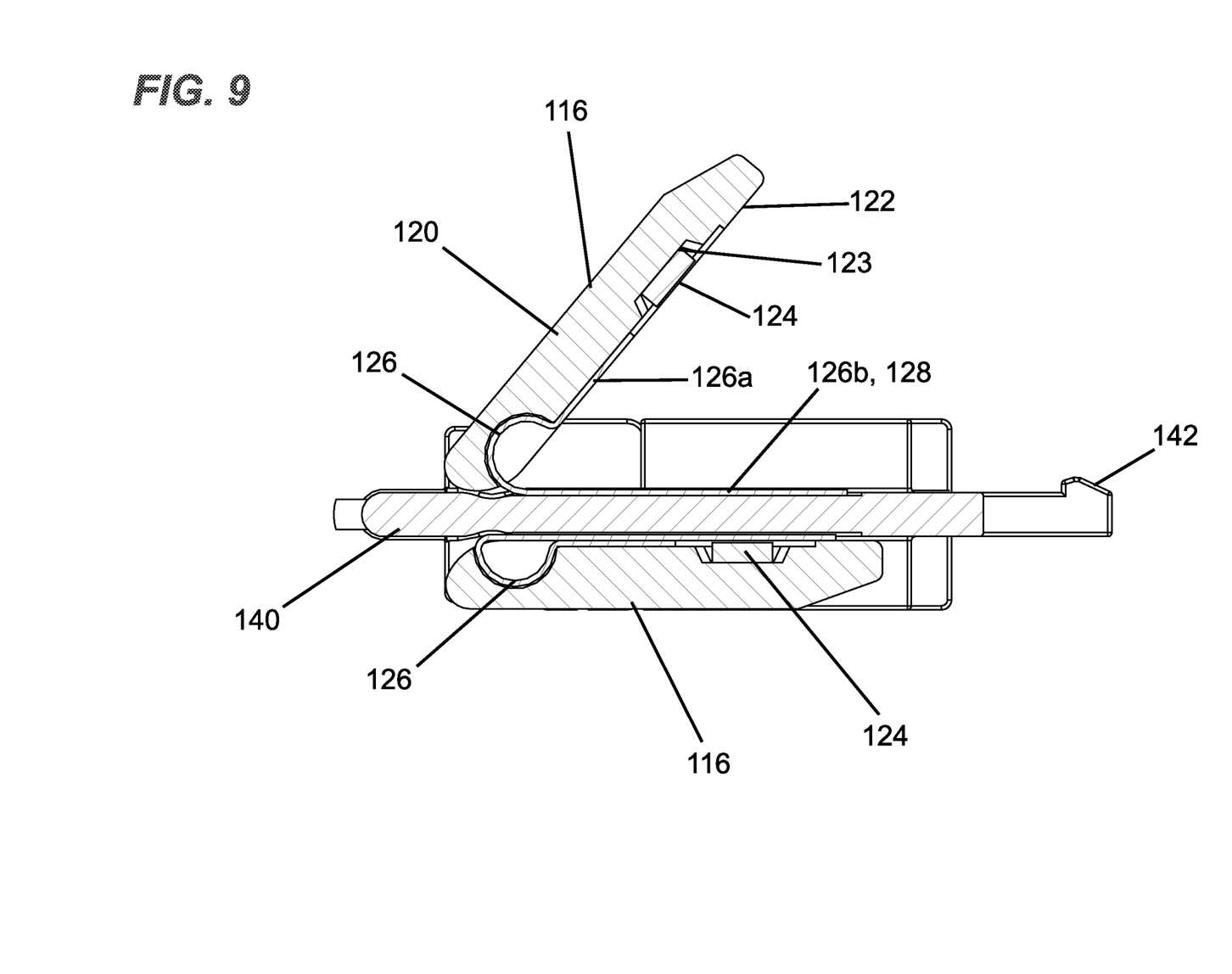
FIG. 9 is a cross-sectional view of the shutter sub-assembly of FIG. 7.

In certain implementations, the signal responder 124 is mounted to the interior side 122 of the shutter 116 and so it not accessible from an exterior of the port 114. In certain examples, the signal responder 124 is recessed into the interior side 122 of the shutter 116 (e.g., see FIG. 8). For example, the signal responder 124 can be mounted within a pocket 123 defined in the shutter 116 at the interior side 122. In some examples, the pocket 123 is sufficiently shallow to enable the signal responder 124 to contact the inhibitor 128 (e.g., the second part 126b of the spring 126) when the shutter 116 is deflected. In other examples, the pocket 123 is sufficiently deep to prevent direct contact between the signal responder 124 and the inhibitor 128.

As shown in FIGS. 6-9, one or more shutters 116 can be formed as modular shutter sub-assembly 150 that mount within ports 114 at a termination component 100. For example, one or more shutters 116 can be mounted to a substrate 140 that is mountable at the termination component 100. In the example shown, a first shutter 116 is mountable to a first side of the substrate 140 and a second shutter 116 is mountable to a second side of the substrate 140. In other examples, the substrate may carry one or more shutters 116 at only one of the sides. The first shutter 116 and the second shutter 116 move between the respective undeflected and deflected positions independently of each other. In certain implementations, each shutter 116 is moved by a respective spring 126 that is not shared with the other shutters 116 on the substrate 140.

Figure 1:
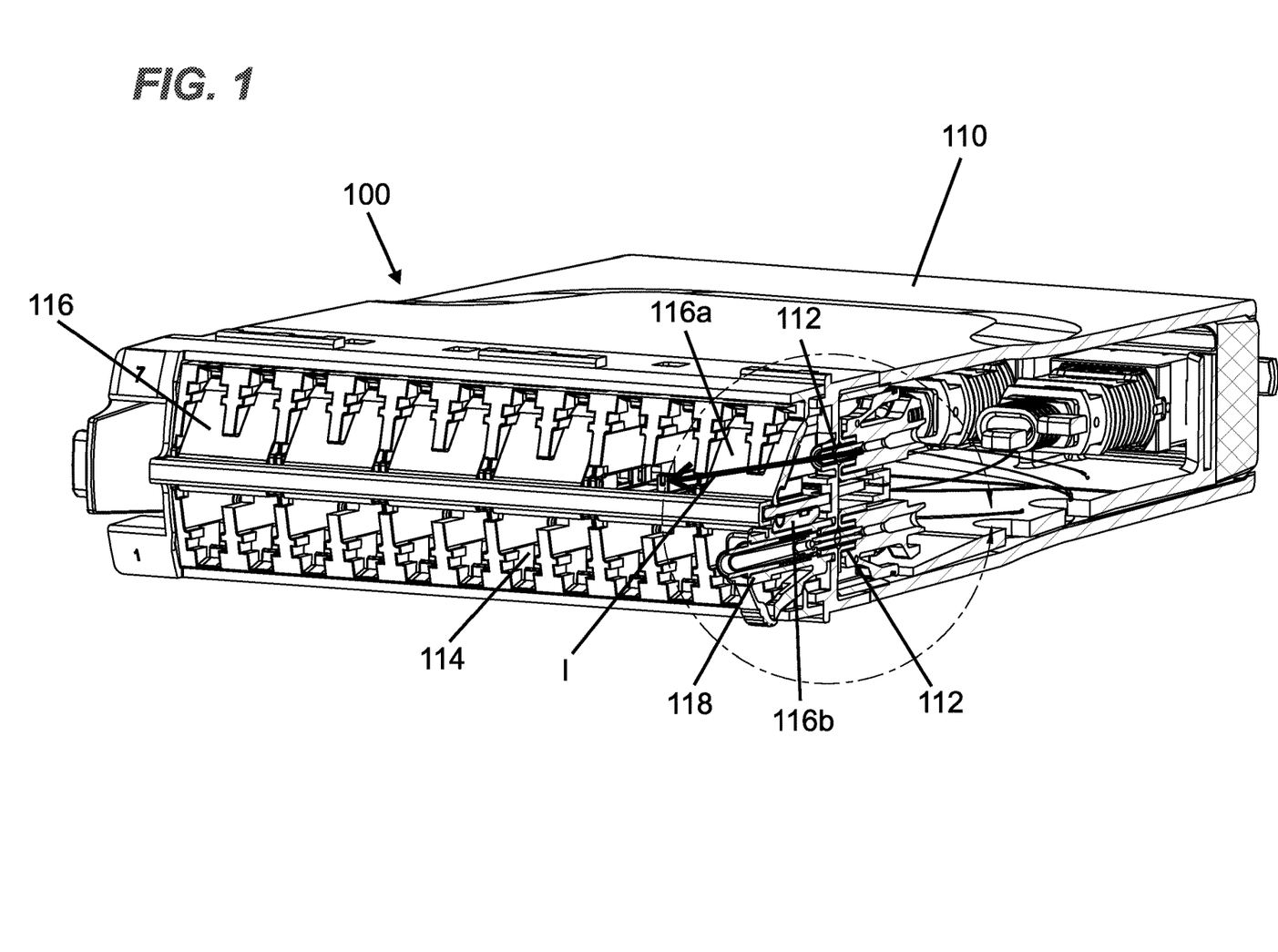
FIG. 1 is a front perspective view of an example termination component defining ports protected by shutters, a portion of the termination component being removed for ease in viewing the shutters.
Figure 2:
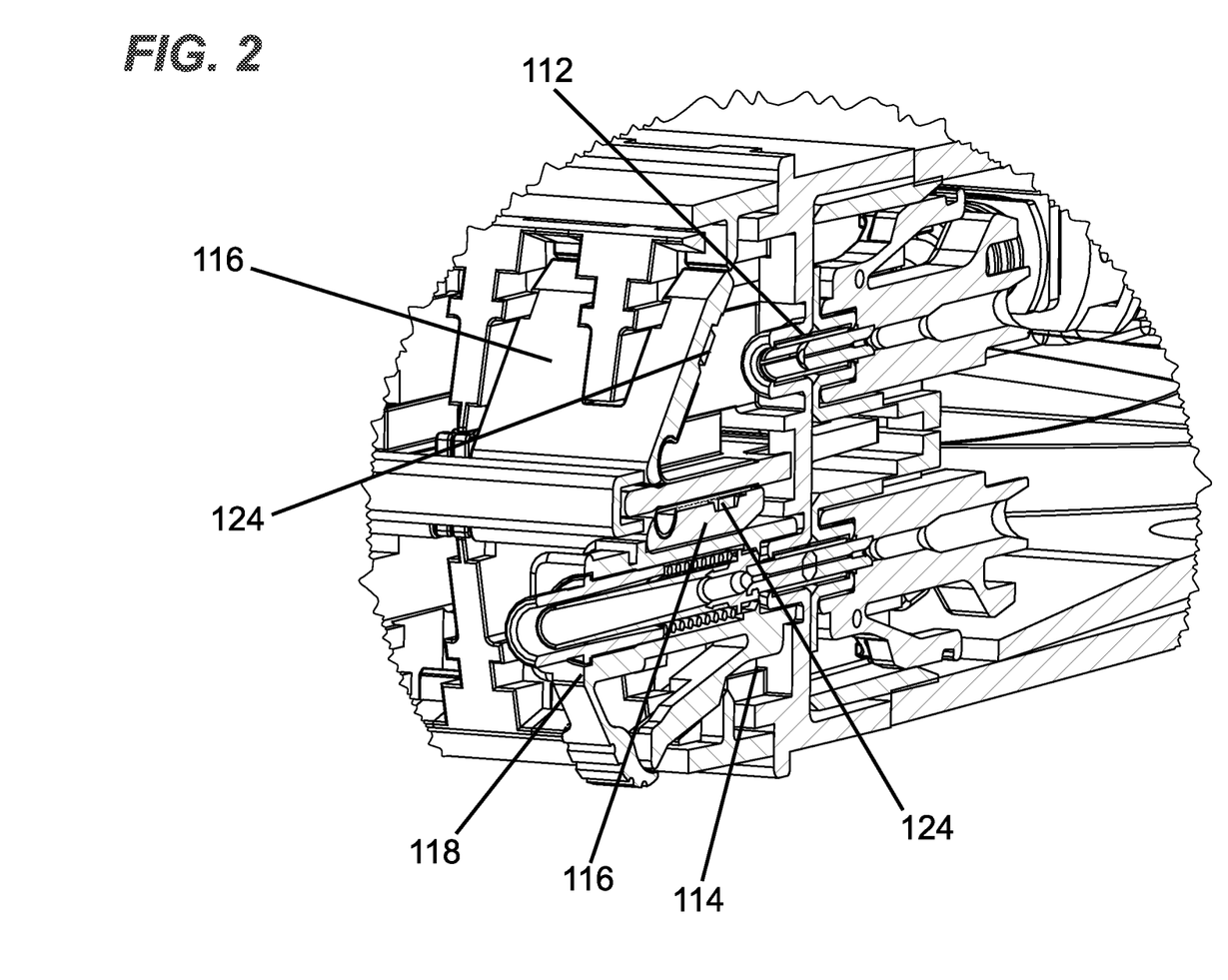
FIG. 2 is an enlarged view of a portion of FIG. 1.
Figure 7:
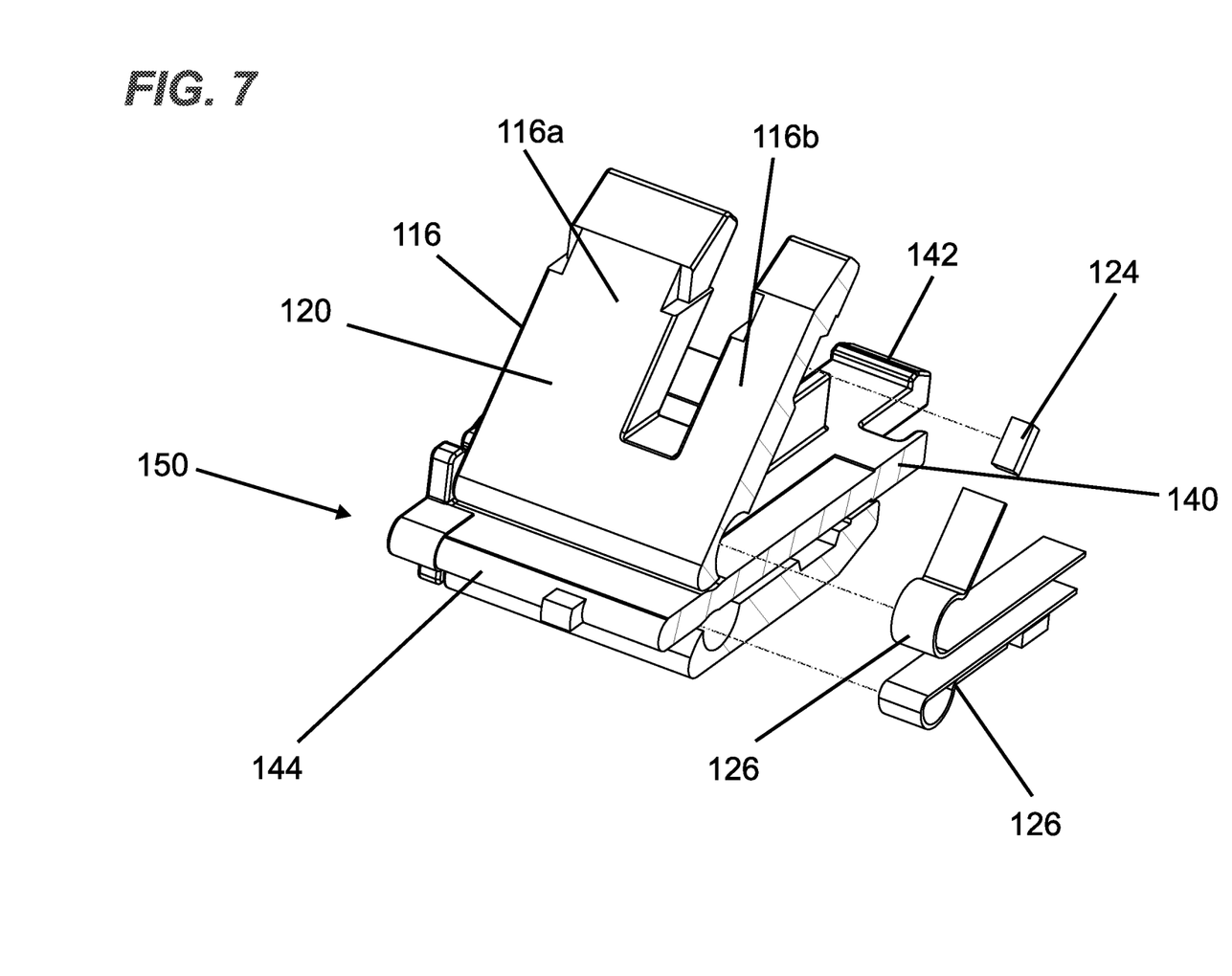
FIG. 7 is an exploded view of an example shutter sub-assembly mountable at the termination component of FIG. 1 as shown in FIG. 6.

In certain implementations, each shutter 116 is sized and shaped to selectively block and provide access to two adjacent ports 114 (e.g., see FIG. 1). For example, as shown in FIG. 7, a shutter 116 may have a first portion 116a that blocks access to a first port 114 and a second portion 116b that blocks access to a second port 114 that is adjacent the first port 114. The first and second portions 116a, 116b move unitarily with each other as the shutter 116 is moved between the undeflected and deflected positions. In certain examples, only one inhibitor 128 is carried by each other. For example, the shutter 116 may be disposed at a pair of ports intended to receive a duplex connector. Accordingly, the pair of ports can be determined to be "occupied" or "available" as a single unit.

The substrate 140 of each modular shutter sub-assembly 150 includes an attachment arrangement that holds the modular shutter sub-assembly 150 to the termination component 100. In the example shown, the attachment arrangement includes a latch arm 142 extend into the termination component 100 from the substrate 140. In certain examples, the attachment arrangement also can include a frame 152 that mounts to the termination component 100 to hold the modular component 150 at the termination component 100. For example, the frame 152 shown in FIG. 6 includes a bar 154 that extends over surfaces 144 of the modular shutter assemblies 150 to hold the modular shutter assemblies 150 at the termination component 100.

Having described the preferred aspects and implementations of the present disclosure, modifications and equivalents of the disclosed concepts may readily occur to one skilled in the art. For example, the shutters 116 carrying the signal responders 124 can be mountable at ports 114 defined by adapter blocks, optical patch panels, optical panels, etc. However, it is intended that such modifications and equivalents be included within the scope of the claims which are appended hereto.

What is claimed is:

1. A termination component comprising:
    a body defining a port;
    a shutter mounted to the body at the port, the shutter being movable between an undeflected position and a deflected position, the shutter extending across the port when in the undeflected position, the shutter allowing access to the port when in the deflected position, the shutter having an interior side facing an interior of the body and an exterior side accessible from an exterior of the body when the shutter is disposed in the undeflected position; and
    a signal responder mounted to the interior side of the shutter to move unitarily with the shutter when the shutter is moved between the undeflected position and the deflected position, the signal responder being detectable when the shutter is disposed in the undeflected position and not being detectable when the shutter is disposed in the deflected position.

2. The termination component of claim 1, wherein the signal responder includes a wireless transceiver.

3. The termination component of claim 2, wherein the signal responder includes an RFID tag.

4. The termination component of claim 1, further comprising a spring mounted to the shutter to bias the shutter to the undeflected position.

5. The termination component of claim 4, wherein the signal responder contacts the spring when the shutter is disposed in the deflected position.

6. The termination component of claim 1, wherein the interior side of the shutter extends horizontally when the shutter is disposed in the deflected position.

7. The termination component of claim 1, wherein the interior side of the shutter is not vertical when the shutter is disposed in the undeflected position.

8. The termination component of claim 1, wherein the signal responder is recessed into the shutter at the interior side.

9. The termination component of claim 1, wherein the shutter is part of a shutter assembly that is separate from the body and removable from the body.

10. The termination component of claim 9, wherein the shutter of the shutter assembly is a first shutter and wherein the shutter assembly includes a second shutter, wherein the second shutter carries a respective signal responder.

11. The termination component of claim 1, wherein the port is one of a plurality of ports defined by the body; and wherein the shutter has a first part disposed at a first port of the plurality of ports and a second part disposed at a second port of the plurality of ports, the second port being adjacent the first port.

12. The termination component of claim 11, wherein the first and second parts are movable as a unit between the undeflected and deflected positions.

13. The termination component of claim 12, wherein the signal responder is mounted to the first part of the shutter and the second part of the shutter is devoid of signal responders.

14. The termination component of claim 1, wherein the port includes an optical port configured to receive an optical plug.

15. The termination component of claim 1, wherein the port includes an electrical socket configured to receive an electrical plug.

16. A communications panel system comprising:
 a panel including a plurality of plug receptacles; and
 a plurality of RFID tags operationally coupled to the panel at respective ones of the plug receptacles, each of the RFID tags being movable between an undeflected position and a deflected position, each of the RFID tags being readable when the RFID tag is disposed in the undeflected position and not being readable when the RFID tag is disposed in the deflected position.

17. The communications panel system of claim 16, wherein each RFID tag is mounted to a shutter that is mounted to the respective plug receptacle, the RFID tags being movable unitarily with the shutters.

18. The communications panel system of claim 16, further comprising an RFID scanner, the RFID scanner being configured to read information from each of the RFID tags.

19. The communications panel system of claim 17, wherein the RFID scanner is operationally coupled to the panel.

20. The communications panel system of claim 19, wherein the panel has a door that is movable between an open position and a closed position, the door blocking access to the plug receptacles when in the closed position, and the door allowing access to the plug receptacles when in the open position, wherein the RFID scanner is mounted to the door, the RFID scanner being configured to read information from each of the RFID tags when the door is closed.

\* \* \* \* \*